US010118274B2

(12) United States Patent
McCoy et al.

(10) Patent No.: US 10,118,274 B2
(45) Date of Patent: Nov. 6, 2018

(54) APPARATUS FOR PRODUCING COMPRESSIVE RESIDUAL STRESS IN BALLS

(71) Applicants: Bryan McCoy, Jamestown, NY (US); John Roth, McKean, PA (US); Nathan Hipwell, McKean, PA (US); Ron Radovich, Washington, PA (US)

(72) Inventors: Bryan McCoy, Jamestown, NY (US); John Roth, McKean, PA (US); Nathan Hipwell, McKean, PA (US); Ron Radovich, Washington, PA (US)

(73) Assignee: AKTIEBOLAGET SKF, Gothenburg (SE)

(*) Notice: Subject to any disclaimer, the term of this patent is extended or adjusted under 35 U.S.C. 154(b) by 305 days.

(21) Appl. No.: 14/928,101

(22) Filed: Oct. 30, 2015

(65) Prior Publication Data

US 2017/0120418 A1    May 4, 2017

(51) Int. Cl.
*B24B 39/04* (2006.01)
*F16C 33/32* (2006.01)
(Continued)

(52) U.S. Cl.
CPC .............. *B24B 39/04* (2013.01); *F16C 33/32* (2013.01); *B24B 11/06* (2013.01); *B24B 37/02* (2013.01); *B24B 37/025* (2013.01)

(58) Field of Classification Search
CPC ....... B24B 39/04; B24B 37/02; B24B 37/025; B24B 11/06; B21D 17/04; B21D 1/00;
(Continued)

(56) References Cited

U.S. PATENT DOCUMENTS 5,655,396 A    8/1997 Siler
6,349,458 B1    2/2002 Al-Rawi
(Continued)

FOREIGN PATENT DOCUMENTS

CN    201895255 U    7/2011
DE    2908933 A1    9/1980
(Continued)

OTHER PUBLICATIONS

Steel Express; 2009; Steel Hardness Conversion Table.*

*Primary Examiner* — Jacob Cigna
*Assistant Examiner* — Lee A Holly
(74) *Attorney, Agent, or Firm* — Mark Ussai; J-Tek Law PLLC

(57) ABSTRACT

An apparatus for imparting compressive residual stress to at least a surface portion of a first plurality of balls includes a first body having a first surface, the first surface including a smooth contact portion, the smooth contact portion being substantially flat or convex and having a surface hardness greater than or equal to the initial surface hardness of the balls. The apparatus also includes a second body having a second surface, the first surface overlying the second surface, and at least one drive operably connected to the first body or to the second body and configured to move one of the first and second bodies relative to the other body at a substantially fixed distance, the at least one drive also being configured to move the first body toward the second body with a force or to move the second body toward the first body with the force.

18 Claims, 4 Drawing Sheets

(51) Int. Cl.
*B24B 37/02* (2012.01)
*B24B 11/06* (2006.01)
*B24B 37/025* (2012.01)

(58) Field of Classification Search
CPC ......... B21D 37/06; B21D 39/06; B22F 7/064; F16C 2361/61; F16C 33/32
See application file for complete search history.

(56) References Cited

U.S. PATENT DOCUMENTS

| | | |
|---|---|---|
| 9,089,947 B2 | 7/2015 | Tanaka et al. |
| 2002/0119858 A1* | 8/2002 | Kino ................... F16H 15/00 475/204 |

FOREIGN PATENT DOCUMENTS

| | | |
|---|---|---|
| DE | 102011082338 A1 | 3/2013 |
| JP | H0557588 A | 3/1993 |
| JP | 2003214435 A | 7/2003 |
| JP | 2005226714 A | 8/2005 |

\* cited by examiner

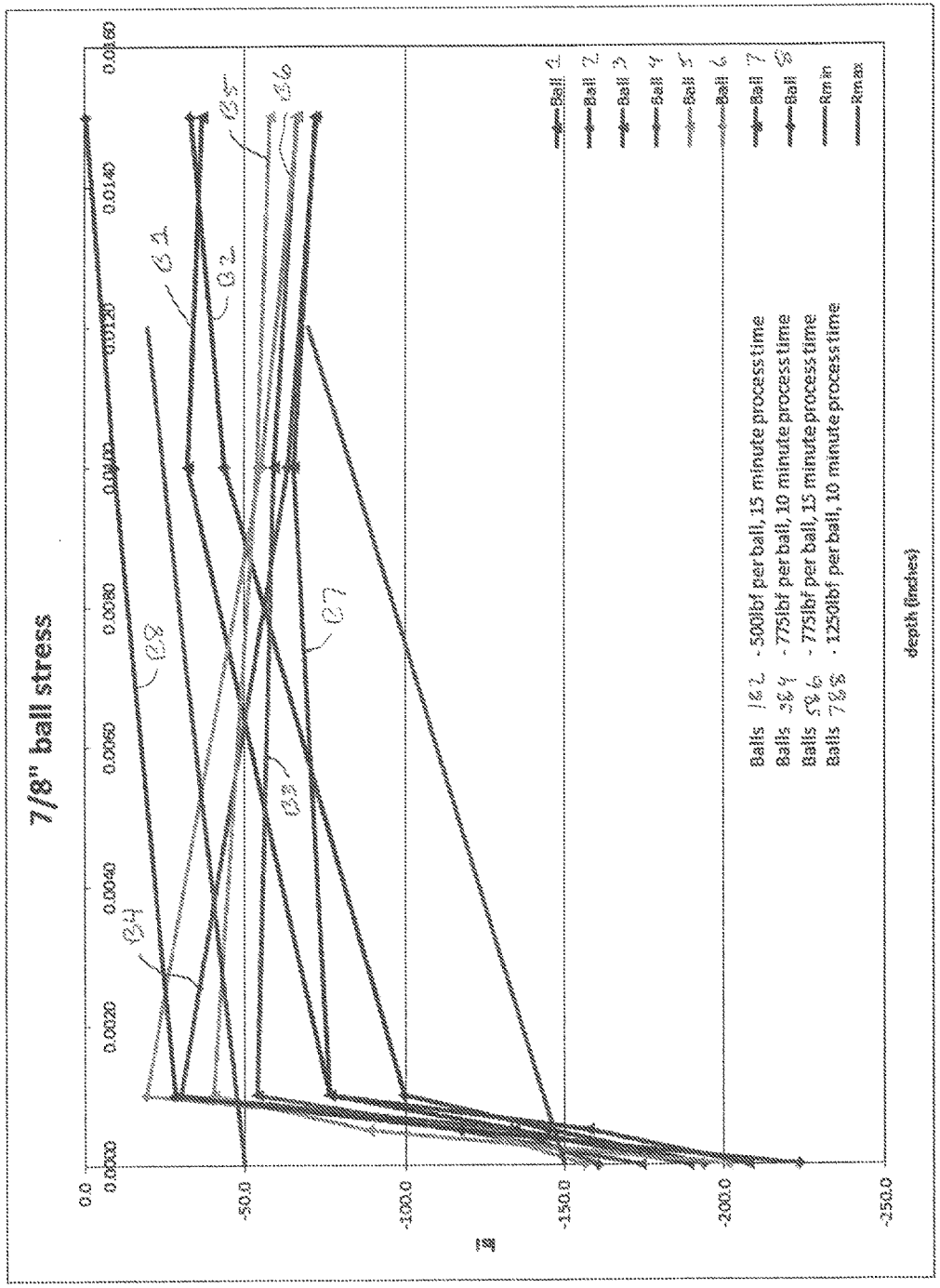

APPARATUS FOR PRODUCING COMPRESSIVE RESIDUAL STRESS IN BALLS

TECHNOLOGICAL FIELD

The present disclosure is directed to an apparatus for producing compressive residual stress in balls, and, more specifically, toward an apparatus for producing compressive residual stress in balls by pressing a plurality of balls between opposing bodies while causing relative motion between the bodies.

BACKGROUND

It is often desirable to produce compressive stresses in spherical objects such as spherical bearing elements, sometimes referred to hereinafter as "balls." This can be challenging when the balls are in a near-finish condition because known methods of imparting stress may damage the surface finish in a manner that requires reworking. Current methods for imparting compressive stress include tumbling and peening operations.

In a tumbling operation, a plurality of balls is placed in a horizontal or inclined drum, and the drum is rotated so that the balls are repeatedly lifted toward the top of the drum and dropped onto the bottom. The force of the ball impacting against the drum (or other balls in the drum) changes the characteristics of the portion of the ball that impacts against the drum or other balls. As the balls are repeatedly lifted and dropped, different surfaces of the balls absorb the impact forces until a somewhat uniform distribution of compressive stress has been imparted to the overall surface of each ball.

One disadvantage of tumbling operations is the amount of noise produced. On an industrial scale, the noise is so loud that these operations must be performed in special rooms or buildings that are soundproof, and workers cannot enter these buildings or rooms without hearing protection. It is also difficult to achieve a uniform distribution of stress/hardness across the entire spherical surface.

In a peening operation, balls are repeatedly accelerated and released so that they impact against a fixed surface or a media such as chilled cast iron shot is accelerated to impact the surface of the balls. This process is also very noisy and provides only limited control over the surface hardness and stress profile of the balls.

It would therefore be desirable to provide a method and apparatus for imparting compressive stress to surface portions of spherical balls in a manner that substantially avoids the foregoing problems.

SUMMARY

These and other problems are addressed by embodiments of the present disclosure, a first aspect of which comprises an apparatus for imparting compressive residual stress to at least a surface portion of a first plurality of balls that have an initial surface hardness. The apparatus includes a first body having a first surface, and the first surface has a smooth contact portion. The smooth contact portion is substantially flat or convex and has a surface hardness greater than or equal to the initial surface hardness of the balls. The apparatus also includes a second body having a second surface positioned such that the first surface overlies the second surface. The apparatus also includes at least one drive operably connected to the first body or to the second body and configured to move the first body relative to the second body at a substantially fixed distance from the second body or to move the second body relative to the first body at a substantially fixed distance from the first body. The at least one drive is also configured to move the first body toward the second body with a force or to move the second body toward the first body with the force.

Another aspect of the disclosure comprises a machine for imparting compressive residual stress to at least a surface portion of a first plurality of balls that have an initial surface hardness. The machine includes a first support and a second support, and the first support or the second support or both the first support and the second support are rotatable about an axis of rotation. A first plate is attached to the first support and it is substantially flat or convex and has a smooth contact portion with a hardness greater than or equal to the initial surface hardness over the circular groove. A second plate is attached to the second support and has a circular groove coaxial with the axis of rotation. At least one drive is configured to rotate the first support relative to the second support or to rotate the second support relative to the first support and to move the first support toward the second support with a force or to move the second support toward the first support with a force.

BRIEF DESCRIPTION OF THE DRAWINGS

These and other aspects of the disclosure will be better understood after a reading of the following detailed description together with the attached drawings.

FIG. 5 is a graph relating compressive stress to depth for a plurality of balls processed for different times under different applications of force.

DETAILED DESCRIPTION

Figure 1:
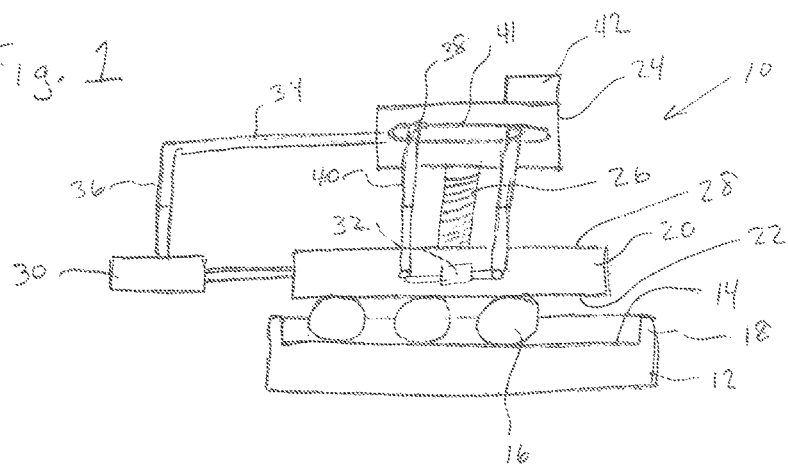
FIG. 1 is a side elevational view of an apparatus for imparting compressive stress, which apparatus includes a top plate and a bottom plate, according to an embodiment of the disclosure.

Referring now to the drawings, wherein the showings are for the purpose of illustrating presently preferred embodiments of the disclosure only and not for the purpose of limiting same, FIG. 1 shows an apparatus 10 having a first body 12 that can be mounted on a floor, bench or other surface (not illustrated). The first body 12 in this case is generally plate-shaped and has a first surface 14 on which a plurality of balls 16 can be disposed for hardening using the apparatus 10. The first surface 14 in this embodiment is smooth and substantially planar and is bounded by a peripheral wall 18 that is tall enough to prevent the balls 16 from leaving the surface 14 even when they are moved back and forth along the surface 14 as discussed below. "Smooth" as used herein means lacking surface features that would damage the balls 16 when they are pressed and rolled between the plates. "Planar" as used herein means generally flat without any grooves, although a slight convexity or concavity overall would not interfere significantly with the operation of the apparatus 10.

The apparatus 10 also includes a second body 20 located above the first body 12. The second body 20 has a second surface 22 facing the first surface 14. The second surface 22 is formed from a material having a hardness that is greater than the surface hardness of the balls 16 that will be processed using the apparatus 10. For example, the second surface 22 will generally have a hardness of HRC 60 or greater. The second surface 22 is also smooth and substantially planar.

The second body 20 is supported above the first body 12 by a drive 24 having a screw 26 connected between a top 28 of the second body 22 and the drive 24. The screw 26 could be replaced by a piston or other non-threaded, linearly actuatable element without exceeding the scope of the disclosure. A first or "x" actuator 30 and a second or "y" actuator 32 are also supported by the drive 24. The x actuator 30 serves to move the second body 20 in an x direction, and the y actuator servers to move the second body 20 in a y direction; the x and y actuators 30, 32 are connected to the drive 24 in a manner that allows the x actuator 30 itself to move in the y direction and the y actuator 32 itself to move in the x direction. For example, the x actuator 30 may be supported by a first horizontal support 34 and a first telescoping vertical support 36 that depends from the first horizontal support 34, and the y actuator 32 may be supported by a second horizontal support 38 and a second telescoping vertical support 40 that depends from the second horizontal support 38. The second telescoping vertical support 40 is slidably mounted in a slot 41 to allow the y actuator 32 to move in the x direction relative to the drive 24 when the x actuator 30 moves the second body 20 relative to the drive 24. The first telescoping vertical support 36 is mounted in a similar groove 41 that is not visible in the drawings. This could also be accomplished with a conveyor in lieu of the body 12 to move cause rotation of the balls in the x direction or ultrasonic vibration of body 12 without the actuator 30.

A controller 42, schematically shown on top of the drive 24, controls the operation of the screw 26 of the drive 24 and the operation of the first and second actuators 30, 32. Signals may be sent between the controller 24 and the other elements by wires (not illustrated) or wirelessly. The controller 42 may comprise a microprocessor or programmable logic controller (not illustrated) configured to receive input signals and to send control signals to the drive 24, the x actuator 30 and the y actuator 32.

In operation, a plurality of the balls 16 to be hardened are placed on the first surface 14, and the controller 42 controls the drive 24 to rotate the screw 26 in order to move the second body 20 toward the balls 16 until the second surface 22 of the second body 20 comes into contact with the balls. The drive 24 continues to press against the plurality of balls until each of the balls 16 of the plurality of balls is subject to a force, 200 to 1500 pounds of force per ball, for example, at which time the drive 24 is stopped and locked in place to maintain this force on the balls 16. At this time, each of the balls 16 will be experiencing a compressive force along a first diameter, in this case, a diameter that is generally vertical and perpendicular to the first surface 14. In a well known manner, this compressive force changes the characteristics of the material of the balls where the force is applied, hardening the surfaces of the balls at this location in the process.

Next the controller 42 operates the x actuator 30 and the y actuator 32 to move the second body 20 relative to the first body 12 while the drive 24 maintains the force on the balls 16. This relative movement between the first body 12 and the second body 20 causes the balls 16 to roll in the direction of movement of the second body 20 along the surface 22 of the first body 12 such that the force applied by the second body 20 is applied along different ball diameters than the original application of force, thereby changing the material characteristics of the areas of the balls 16 at either end of the diameter. By moving the second body 20 in x and y directions relative to the first body 12, the entire surface of each ball 16 can be exposed to the force of drive 24 until the entire surface of each ball 16 has been exposed at least once, and preferably multiple times, to the force of the drive 24, thereby hardening a surface layer of all of the balls 16 to a given depth.

The pressure applied to the balls 16 and the time during which the second body 20 is moved relative to the first body 12 are determined based on the material of the balls 16 and the desired compressive stress profile. For example, balls of the type conventionally used as spherical rolling elements in a bearing may be subjected to forces of about 200 to about 1500 pounds for periods of time ranging from about 5 minutes to about 20 minutes. However, the actual times and pressures that will provide a desirable compressive stress profile are preferably determined empirically based on the material of the balls 16 and the use to which the balls 16 will be put. Beneficially, unlike tumbling, where the mass of the balls and the height from which they are dropped determine the range of compressive stress obtainable, using the present disclosure, a compressive stress profile can be created independently of ball mass, and this gives workers greater control over the final stress profile of the balls 16. This approach also provides a greater degree of uniformity in stress profiles because some of the randomness of tumbling balls is not present, and is also substantially quieter than conventional ball processing methods.

Figure 2:
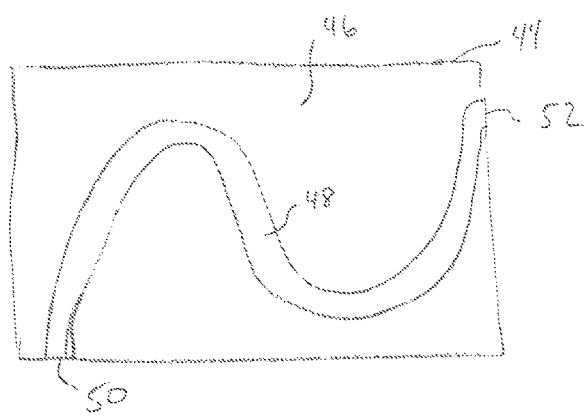
FIG. 2 is a top plan view of an alternative bottom plate usable in the apparatus of FIG. 1.

In a modified version of the apparatus 10, the first body 12 is replaced with a grooved body 44, illustrated in FIG. 2, which grooved body 44 has a generally flat upper surface 46 that faces the second surface 22 of the second body 20 and a groove 48 in the upper surface 46. The groove 48 has a diameter approximately the same as or slightly greater than the diameters of the balls 16 and defines a path over which the balls 16 will travel as they are moved by the first body 12. For example, in FIG. 2, the groove 48 is generally sinusoidal, and the x actuator 30 and the y actuator 32 may be driven by the controller 42 to move the second body 20 in a generally sinusoidal manner relative to the grooved body 44 to move the balls 16 from a first end 50 of the groove 48 to a second end 52 of the groove 48.

Suitable feeding and receiving mechanisms (not illustrated) may be provided to insert individual balls 16 into the first end 50 of the groove 48 and to receive the balls 16 as they exit the second end 52 of the groove 48. The groove 48 beneficially restrains the balls 16 and controls their movement along a path. Moreover, the sinusoidal movement of the second body 20 relative to the grooved body 46 causes the balls 16 to rotate as they traverse the groove 48 which helps induce stress into different portions of the balls 16 because the diameters along which the force is applied will change as the balls 16 roll along the groove 48. Additional stress may be provided by passing balls 16 along the groove 48 multiple times, that is, by taking the balls 16 that have exited from the second end 52 of the groove 48 and reintroducing them into the first end 50 of the groove 48 one or more times for additional stress. A relatively short groove is shown for illustration purposes. Longer grooves and/or grooves having different shapes could be employed without exceeding the scope of this disclosure.

Figure 3:
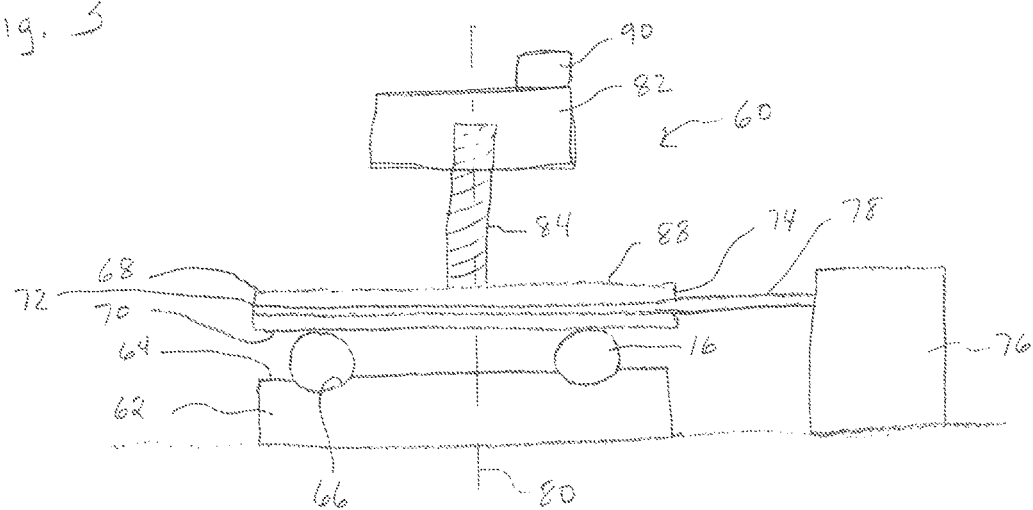
FIG. 3 is a side elevational view of an apparatus for imparting compressive stress, which apparatus includes a top plate and a bottom plate, according to another embodiment of the disclosure.
Figure 4:
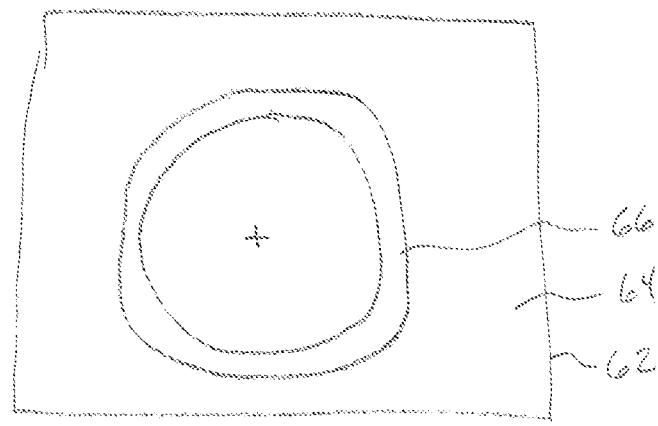
FIG. 4 is a top plan view of the bottom plate of the apparatus of FIG. 3.

FIG. 3 shows an apparatus 60 for hardening balls 16 according to another embodiment of the disclosure. The apparatus 60 includes a first body 62 that can be mounted on a floor, bench or other surface (not illustrated). The first body 62 has a first surface 64, and a circular groove 66 formed in the first surface 64, which circular groove 66 has a groove diameter about equal to or slightly greater than the diameter of the balls 16 to be stressed in the apparatus 60. The apparatus 60 also includes a second body 68 located above the first body 62. The second body 68 has a second surface 70 facing the first surface 64 and overlying the groove 66. The second surface 70 is formed from a material having a hardness (e.g., HRC 60 or greater) that is at least the same hardness as the surface hardness of the balls 16 and is smooth and substantially planar. The second body 68 also includes a peripheral groove 72 in an outer surface 74 which outer surface 74 is also preferably circular.

A motor 76 is mounted adjacent to the first body 62, and a drive belt 78 connects the motor 76 to the peripheral groove 72 in the second body 68. The motor 76 is configured to cause the second body 68 to rotate about an axis of rotation 80 for reasons discussed further below.

The second body 68 is supported above the first body 62 by a drive 82 having a screw 84 connected between a top 88 of the second body 68 and the drive 82. The screw 84 could be replaced by a piston or other non-threaded, linearly actuatable element without exceeding the scope of the disclosure. The axis of rotation of the screw 84 is coaxial with the axis of rotation 80 of the second body 68 and passes through a center of the circle followed by the circular groove 66. The drive 82 is operable to move the second body 68 toward and away from a plurality of balls 16 in the circular groove 66 and to press the plurality of balls 16 against the first body 62 with a controllable force.

A controller 90 is schematically shown on top of the drive 82, controls the operation of the screw 84 of the drive 82 and the operation of the motor 76. Signals are sent between the controller 90 and the other elements by wires (not illustrated) or wirelessly. The controller 82 may comprise a microprocessor or programmable logic controller (not illustrated) configured to receive input signals and to send control signals to the drive 82 and the motor 76.

In operation, a plurality of the balls 16 to be stressed is placed in the circular groove 66, and the controller 90 controls the drive 82 to rotate the screw 84 in order to move the second body 68 toward the balls 16 until the second surface 70 of the second body 68 comes into contact with the balls 16. The drive 90 continues to press against the plurality of balls 16 until each of the balls 16 of the plurality of balls is subject to a force, 200 to 1500 pounds of force per ball, for example, at which time the drive 90 is stopped and locked in place to maintain this force on the balls 16. At this time, each of the balls 16 will be experiencing a compressive force along a first diameter, in this case, a diameter that is generally vertical and perpendicular to the first surface 64. The force is generally parallel to the axis of rotation of the screw 84 and thus generally parallel to the first diameter of the balls 16. The direction of force application could also be described as parallel to lines normal to the central bottom portion of the circular groove 66. The motor 76 is then operated in order to rotate the second body 68 relative to the first body 62, and this rotation of the second body 68 drives the plurality of balls 16 around the circular groove 66.

Due to friction between the balls 16 and the groove 66 and between the balls 16 and the second body 68, the orientations of the balls 16 change so that forces are applied along diameters other than the aforementioned first diameter. In this manner, as the balls 16 are moved around the groove 66, different parts of their outer surfaces are stressed, and after a sufficient running time, a desired stress profile is obtained which is generally consistent across all the balls of the plurality of balls 16.

In an alternate embodiment (not illustrated) the drive 82 could be configured to cause the second body 68 to rotate in addition to causing the second body 68 to move toward and away from the first body 62. In that case, it would not be necessary to employ the motor 76. In further embodiments, the second body 68 could be caused to rotate by a drive chain (not illustrated) or directly drive by the shaft of an appropriately configured direct drive motor (not illustrated).

FIG. 5 illustrates various depth profiles that were obtained using an apparatus generally similar to apparatus 60 of FIG. 3. These depth profiles show the level of compressive stress present in each of the balls at different depths and how the compressive stress levels vary with depth under the application of different forces for different amounts of time. The plots related to ball 1, ball 2, ball 3, ball 4, ball 5, ball 6, ball 7 and ball 184 are labeled B1 . . . B8 in FIG. 5. The degree of compressive stress is measured in kilopounds per square inch (ksi) and depth is measured in inches.

These data show that changing the amount of force used to press the balls 16 between the first body and the second body and changing the duration of force application each affect the depth profiles, that is, the amount of compressive stresses at different depths of the balls. For example, balls 3, 4, 5, and 6 were all subjected to 775 lbf,—balls 3 and 4 for 10 minutes and balls 5 and 6 for 15 minutes. The plots B3, B4, B5 and B6 show that time and pressure both affected the depth profiles. Also, the plots B1 and B2, showing depth profiles of balls which were subjected to 500 lbf for 15 minutes are different than those of balls 7 and 8 which were subject to 1250 lbf for 10 minutes. It should thus be possible to achieve a wide variety of depth profiles which may be desirable for various applications. Importantly, FIG. 5 shows that a greater variety of depth profiles are possible using the disclosed apparatus than can be obtained with a conventional ball tumbling device, at least because the applied force can be set independently of the mass of the balls being processed.

The first apparatus 10 and the second apparatus 60 discussed above are essentially batch processing apparatuses—that is, starting with no balls on the first body 12 or 62, a given number of balls 16 are added, pressure is applied, and the balls are rolled between first and second bodies for a given amount of time. The grooved body 44 of FIG. 2, on the other hand, may allow for continuous processing—that is, balls are added to the first end 50 of the groove 48 and moved along to the second end 52 of the groove 48 while being stressed during the time spent in the groove 48. Untreated and/or previously treated balls can be added to the first end 50 of the groove 48 while balls that have undergone processing are removed from the second end 52 of the groove.

Figure 6:
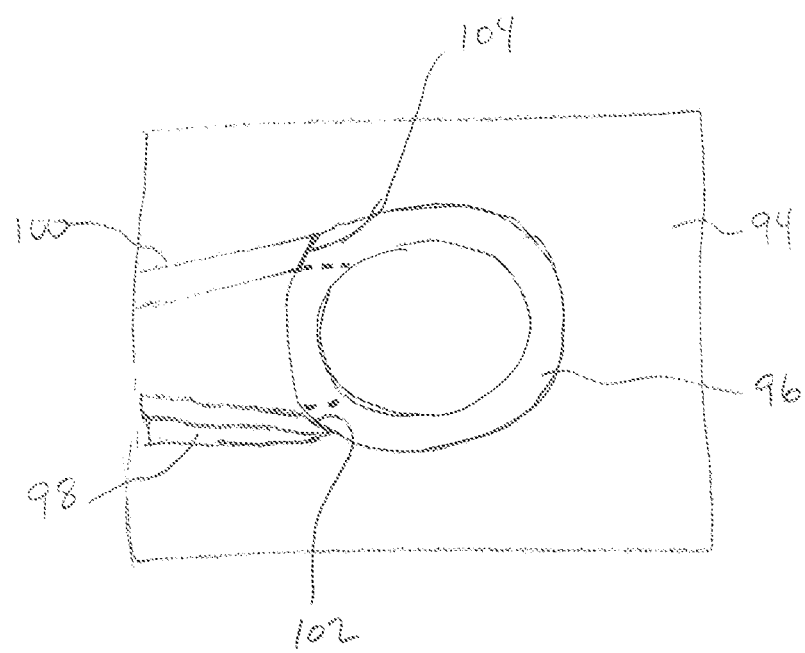
FIG. 6 is a top plan view of an alternate bottom plate usable in the apparatus of FIG. 3.

An apparatus can also be provided that can process a plurality of batches of balls 16 in a substantially continuous manner, thereby providing more control over the amount of time during which pressure is applied to the balls. This apparatus is substantially identical to the apparatus 60 of FIG. 3, and therefore FIG. 6 shows only a modified first body 94, the other elements being identical to those illustrated in FIG. 3. The first body 94 includes a circular groove 96. An entrance ramp 98 leads to the circular groove 96 at a first location, and an exit groove 100 leads away from the circular groove 96 from a second location. A first gate 102 is provided at the first location and is movable between a first position, illustrated in solid lines in FIG. 6, in which it forms part of a sidewall of the groove 96 and blocks the entrance ramp 98 so that balls 16 on the entrance ramp 98 cannot enter the groove 96. The first gate 102 is shiftable to a second position, illustrated in dashed lines in FIG. 6, which permits balls 16 on the entrance ramp 98 to roll into the groove 96. A second gate 104 is provided at the second location and is movable between a first position, illustrated in solid lines in FIG. 6, in which it forms part of a side wall of the groove 96 and blocks the exit groove 100 so that balls 16 circulating in the circular groove 96 cannot reach the exit groove 100, and a second position illustrated in dashed lines in FIG. 6, which opens the exit groove 100 and guides balls circulating in the circular groove 96 into the circular groove 100 and away from the first body 94.

The height of the entrance ramp 98 is less than the height of the balls 16 when present in the circular groove 96 and therefore the ramp 98 is not contacted by the second body (not illustrated in FIG. 6) when it presses down on the balls 16 in the circular groove 96.

In operation, starting with groove 96 empty, a plurality of the balls 16 are placed on the entrance ramp 98, and the first gate 102 is opened to allow the balls 16 to enter the circular groove 96. The second body (not illustrated) is rotated to help draw the balls 16 into the groove. When the circular groove 96 is full or substantially full of the balls 16, the first gate 102 is closed to prevent additional balls 16 from entering the circular groove 96 and to form a side wall portion of the circular groove 96. Then the second body is moved against the balls 16 in the circular groove 96 and processed as discussed above in connection with the embodiment of FIG. 3. After a predetermined processing time, the force applied by the second body against the balls 16 is reduced and the second gate 104 is opened to allow the balls in the circular groove 96 to enter the exit groove 100 as the second body continues to move the balls 16 around the circular groove 96 toward the exit groove 100. The process can then be repeated with the same plurality of balls or a new plurality of balls.

In order to establish the first force at an appropriate level, the groove 96 may first be filled with a plurality of starter balls (not illustrated) having properties different than those of the balls 16. Thus, for example, a plurality of hard rubber balls could be placed in the groove 96 and the force for processing the balls 16 can be applied to the starter balls. When the groove 96 is filled with the starter balls, the second body is rotated to move the starter balls toward the exit groove 100 while the balls 16 to be processed are moved into the circular groove 96 by the rotation of the second body. In this manner, it is never necessary to apply force to one or a small number of balls in the groove—that is, the groove 96 will always be substantially filled with balls when the processing force is being applied. So-called starter balls could also be used at the end of a batch and added to the groove 96 as finished ones of the balls 16 are being removed at the exit groove 100.

Figure 7:
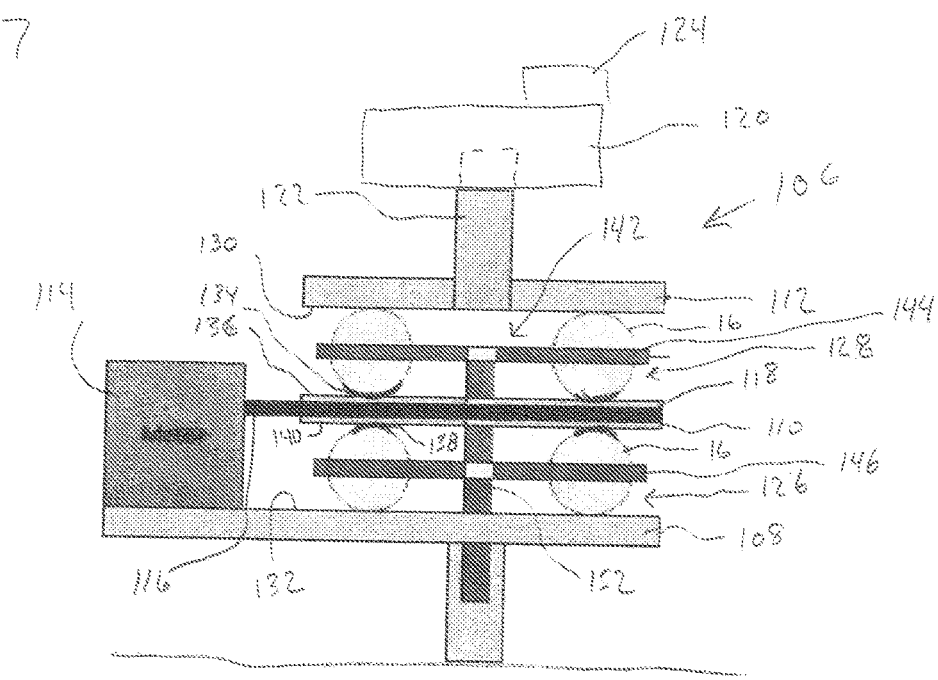
FIG. 7 is a side elevational view of an apparatus for imparting compressive stress according to another embodiment.
Figure 8:
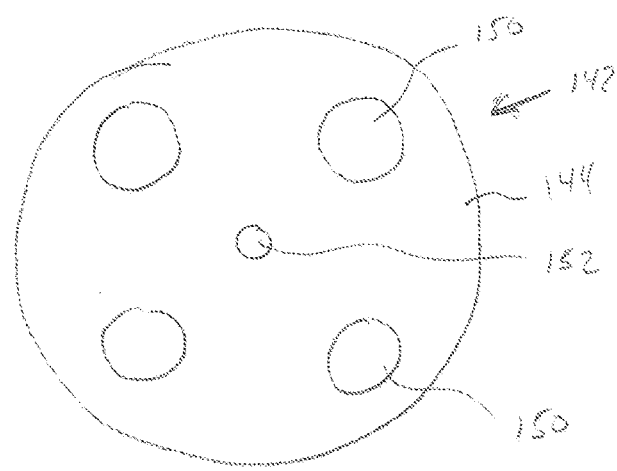
FIG. 8 is a top plan view of a retaining plate usable in the apparatus of FIG. 7.

A further embodiment of the disclosure is illustrated in FIGS. 7 and 8. In this embodiment, an apparatus 106 includes a base plate 108 mountable on the ground or another support surface, a center plate 110 and a top plate 112. A motor 114 is mounted on the base plate 108, and a drive belt 116 connects the motor 114 to a circumferential groove 118 on the center plate 110 to cause the center plate 110 to rotate. Both the base plate 108 and the top plate 112 are preferably rotationally fixed relative to the motor 114. The top plate 112 is connected to a drive 120 by a screw 122, and a controller 124 is provided for controlling the drive 120 and the motor 114. This use of three plates allows the processing of two levels of balls simultaneously, namely, a first set of balls 126 between the base plate 108 and the center plate 110 and a second set of balls 128 between the center plate 110 and the top plate 112. The drive 120 is configured to press the top plate 112 toward the center plate 110, and, when the second plurality of balls 128 is present between the top plate 112 and the center plate 110, the downward force produced by the drive 120 also presses the center plate 110 toward the base plate 108.

At least one of the surfaces pressing against the first 126 and second 128 plurality of balls should be smooth and substantially flat. Thus for example, the bottom surface 130 of the top plate 112 and the top surface 132 of the base plate 108 may each be smooth. A first groove 134 may be provided in the upper surface 136 of the center plate 110 and a second groove 138 may be provided in the lower surface 140 of the center plate to help guide the first and second sets of balls in a circular path when the center plate 110 is rotated by the drive 120. However, the use of a groove may not be necessary in all embodiments. For example, this embodiment also includes an apertured guide plate 142 having a circular upper portion 144 and lower portion 146 that is configured to guide the first and second sets of balls along circular paths even in the absence of grooves in any of the base plate 108, center plate 110 and/or top plate 112. The guide plate 142 can be used whether or not grooves are present in any of the plates.

The guide plate 142, the circular upper portion 144 of which is illustrated in top plan view in FIG. 8, has a plurality of apertures 150 each having a diameter slightly larger than the diameters of the balls to be processed. The guide plate 142 includes a center post 152 to which the upper portion 144 and lower portion 146 are mounted, and the center post 152 is mounted for rotation relative to the base plate 108.

To load the apparatus 106, the top plate 112 is raised to a maximum spacing from the upper portion 144 of the guide plate 142, and the center plate 110 is moved axially along the center post 152 until it contacts the bottom surface 130 of the top plate 112 so that the first set of balls 126 can be inserted into the apertures 150 in the lower portion 146 of the guide plate 142. When all apertures 150 are full (and more than the four exemplary apertures 150 illustrated may be provided), the center plate 112 is lowered onto the top surfaces of the first set of balls 126, and the second set of balls 128 is placed into the apertures 150 of the upper portion 144 of the guide plate 142. The drive 120 is then operated to move the upper plate 112 against the second set of balls 128, and a force is applied to compress the first set of balls 126, second set of balls 128 and center plate 110 between the upper plate 112 and the base plate 108. The controller 124 then causes the motor to rotate the center plate 110, and processing is carried out at a given force for a desired time period as discussed above in connection with earlier embodiments. This configuration allows a larger number of balls to be processed in a relatively small space.

A first method of imparting compressive stress to at least a surface portion of a first plurality of balls according to the disclosure, where the balls have an initial surface stress, includes placing the first plurality of balls between a first body having a first surface and a second body having a second surface. The first surface includes a smooth contact portion that is substantially flat or convex and that has a surface hardness greater than the initial surface hardness of the balls. The method also includes imparting a compressive stress along a first diameter of the first plurality of balls by pressing the first body toward the second body or the second body toward the first body or the first and second bodies toward one another with a force, and causing relative movement between the first surface and the second surface while maintaining the force at or above a minimum level to impart the compressive stress along other diameters of the first plurality of balls different than the first diameter.

Another method of imparting compressive stress to at least a surface portion of a first plurality of balls having an initial surface hardness involves using a machine having a first support and a second support. The first support or second support or both the first support and the second support are rotatable about an axis of rotation. The method includes placing the first plurality of balls in a circular groove in a first plate attached to the first support, the first plate being attached to the first support such that a center of the circle of the circular groove lies on the axis of rotation, placing a second plate having a smooth contact surface having a hardness greater than the initial hardness against the first plurality of balls in the circular groove. The second plate is attached to the second support and the contact surface is substantially flat or convex. The method also includes imparting a compressive stress to the first plurality of balls by pressing the first support toward the second support or the second support toward the first support or the first and second supports toward one another with a force, and causing relative rotation between the first plate and the second plate while maintaining the force at or above a minimum level to move the first plurality of balls around the circular groove.

Combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

The present invention has been described herein in terms of presently preferred embodiments. Additions and modifications to these embodiments will become apparent to persons of ordinary skill in the art upon a review of the foregoing disclosure. It is intended that all such modifications and additions form a part of the present invention to the extent they fall within the scope of the several claims appended hereto.

We claim:

1. An apparatus for imparting compressive residual stress to at least a surface portion of a first plurality of balls, the balls having an initial surface hardness, the apparatus comprising:
    a first body having a first surface, the first surface including a smooth contact portion, the smooth contact portion being substantially flat or convex and having a surface hardness greater than or equal to the initial surface hardness of the balls,
    a second body having a second surface, the first surface overlying the second surface, and
    at least one drive operably connected to the first body or to the second body and configured to move the first body relative to the second body at a substantially fixed distance from the second body or to move the second body relative to the first body at a substantially fixed distance from the first body, the at least one drive also being configured to move the first body toward the second body with a force or to move the second body toward the first body with the force,
    wherein the second surface includes at least one circular groove facing the smooth contact portion, the at least one groove having an entrance and an exit, the exit being configured to allow the first plurality of balls to exit the groove through a sidewall or bottom of the at least one groove.

2. The apparatus of claim 1, wherein the force is from 200 pounds to 1500 pounds.

3. The apparatus of claim 1, wherein the contact portion is substantially planar.

4. The apparatus of claim 3, wherein the second surface includes at least one circular groove facing the smooth contact portion and wherein the at least one drive is configured to move the first plurality of balls around the at least one circular groove.

5. The apparatus of claim 3, wherein the entrance is configured to allow the first plurality of balls to enter the groove through a sidewall or bottom of the at least one groove.

6. The apparatus of claim 3, wherein the first body comprises a first plate and the second body comprises a second plate.

7. The apparatus of claim 3, wherein the groove is configured such that lines normal to a bottom of the groove are not coplanar and are not collinear.

8. The apparatus of claim 3, wherein the at least one drive includes a first drive configured to rotate the first body relative to the second body about an axis of rotation perpendicular to the contact portion or configured to rotate the second body relative to the first body about the axis of rotation.

9. The apparatus of claim 8, wherein the axis of rotation is parallel to a direction of the force.

10. The apparatus of claim 8, wherein the first body has a second surface opposite the first body first surface, the first body second surface including a smooth contact portion, the smooth contact portion being substantially flat or convex and having a surface hardness greater than the initial surface hardness of the balls, the apparatus further including a third body mounted such that the first body is located between the second body and the third body and wherein the at least one drive is operably connected to the first body and configured to rotate the first body relative to the second body and relative to the third body.

11. The apparatus of claim 3, wherein the second body includes at least one groove in the second surface and wherein the at least one drive is configured to move the first body relative to the second body or the second body relative to the first body in a manner that moves the first plurality of balls along the at least one groove.

12. The apparatus of claim 11, wherein the at least one groove is a curved groove.

13. The apparatus of claim 12 wherein the at least one curved groove is circular.

14. The apparatus of claim 13, wherein a rotational axis of the first body or a rotational axis of the second body or rotational axes of the first body and the second body pass through a center of the circle of the circular groove.

15. A machine for imparting compressive residual stress to at least a surface portion of a first plurality of balls having an initial surface hardness, the machine comprising:
- a first support and a second support, the first support or second support or both the first support and the second support being rotatable about an axis of rotation,
- a first plate attached to the first support and being substantially flat or convex and having a smooth contact portion having a hardness greater than or equal to the initial surface hardness,
- a second plate attached to the second support and including a circular groove coaxial with the axis of rotation, and
- at least one drive configured to rotate the first support relative to the second support or to rotate the second support relative to the first support and to move the first support toward the second support with a force or to move the second support toward the first support with a force,
- wherein the circular groove includes an entrance and an exit, the exit being configured to allow the first plurality of balls to exit the circular groove through a side wall or a bottom of the circular groove.

16. The apparatus of claim 15, wherein the machine comprises a vertical spindle machine or a horizontal spindle machine.

17. The apparatus of claim 15, wherein the smooth contact portion is substantially planar.

18. The apparatus of claim 15, wherein the second plate is substantially flat or convex.

* * * * *